(12) United States Patent
Frederiksen et al.

(10) Patent No.: US 9,520,981 B2
(45) Date of Patent: Dec. 13, 2016

(54) METHOD AND APPARATUS FOR PROVIDING AUTOMATIC CONTROL CHANNEL MAPPING

(75) Inventors: Frank Frederiksen, Klarup (DK); Troels Emil Kolding, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 920 days.

(21) Appl. No.: 12/596,714

(22) PCT Filed: Jan. 11, 2008

(86) PCT No.: PCT/IB2008/000063
§ 371 (c)(1),
(2), (4) Date: May 20, 2010

(87) PCT Pub. No.: WO2008/084392
PCT Pub. Date: Jul. 17, 2008

(65) Prior Publication Data
US 2010/0260115 A1    Oct. 14, 2010

Related U.S. Application Data

(60) Provisional application No. 60/884,759, filed on Jan. 12, 2007.

(51) Int. Cl.
*H04L 5/02* (2006.01)
*H04L 27/26* (2006.01)
*H04W 28/18* (2009.01)
*H04W 72/00* (2009.01)

(52) U.S. Cl.
CPC ........... *H04L 5/023* (2013.01); *H04L 27/2608* (2013.01); *H04W 28/18* (2013.01); *H04W 72/00* (2013.01)

(58) Field of Classification Search
None
See application file for complete search history.

(56) References Cited

U.S. PATENT DOCUMENTS

| | | | | |
|---|---|---|---|---|
| 5,381,443 A | * | 1/1995 | Borth et al. | 370/329 |
| 5,627,880 A | * | 5/1997 | Rozanski et al. | 370/335 |
| 5,907,545 A | * | 5/1999 | Arai et al. | 370/342 |
| 6,031,864 A | * | 2/2000 | Bauchot et al. | 370/322 |
| 6,072,787 A | * | 6/2000 | Hamalainen | H04J 3/1647 370/335 |
| 6,496,532 B1 | * | 12/2002 | Raitola et al. | 375/132 |
| 6,519,259 B1 | * | 2/2003 | Baker et al. | 370/395.4 |

(Continued)

FOREIGN PATENT DOCUMENTS

WO    2008014275    1/2008

OTHER PUBLICATIONS

NTT Docomo et al: "Coding Scheme of L1/L2 Control Channel for E-UTRA Downlink", 3GPP TSG-RAN WG1 Meeting AD HOC LTE, p. 1-19, Jun. 27, 2006.

(Continued)

*Primary Examiner* — Chirag Shah
*Assistant Examiner* — Joshua Smith
(74) *Attorney, Agent, or Firm* — Squire Patton Boggs (US) LLP

(57) ABSTRACT

An approach is provided for control signaling. A sub-set of channel parameters is received. Control channels are automatically mapped to physical resources of a communication network according to the received channel parameters.

16 Claims, 15 Drawing Sheets

(56) References Cited

U.S. PATENT DOCUMENTS

| | | | | |
|---|---|---|---|---|
| 6,567,461 | B1* | 5/2003 | Moon | H04J 13/102 370/335 |
| 6,728,233 | B1* | 4/2004 | Park | H04W 28/18 370/335 |
| 6,741,580 | B1* | 5/2004 | Kim | H04W 48/12 370/337 |
| 2001/0001609 | A1* | 5/2001 | Mikuni et al. | 370/337 |
| 2001/0014608 | A1* | 8/2001 | Backstrom et al. | 455/450 |
| 2003/0069042 | A1* | 4/2003 | Sato et al. | 455/561 |
| 2003/0072293 | A1* | 4/2003 | Fischer | 370/345 |
| 2003/0112777 | A1* | 6/2003 | Li et al. | 370/335 |
| 2004/0023659 | A1* | 2/2004 | Xiao | H04W 52/325 455/450 |
| 2004/0082333 | A1* | 4/2004 | Ito et al. | 455/450 |
| 2004/0190482 | A1* | 9/2004 | Baum et al. | 370/347 |
| 2004/0264421 | A1* | 12/2004 | Sato et al. | 370/337 |
| 2005/0002349 | A1* | 1/2005 | Hayashi et al. | 370/320 |
| 2005/0041629 | A1* | 2/2005 | Lee | H04B 7/264 370/342 |
| 2005/0052991 | A1* | 3/2005 | Kadous | 370/216 |
| 2005/0070320 | A1* | 3/2005 | Dent | 455/516 |
| 2005/0111397 | A1* | 5/2005 | Attar | H04W 28/18 370/319 |
| 2005/0120097 | A1 | 6/2005 | Walton | |
| 2005/0195784 | A1* | 9/2005 | Freedman et al. | 370/338 |
| 2005/0254442 | A1* | 11/2005 | Proctor et al. | 370/294 |
| 2006/0056360 | A1* | 3/2006 | Parkvall et al. | 370/335 |
| 2006/0133262 | A1* | 6/2006 | Sutivong et al. | 370/329 |
| 2006/0215603 | A1* | 9/2006 | Nishio et al. | 370/329 |
| 2006/0252389 | A1* | 11/2006 | Yellin et al. | 455/115.3 |
| 2006/0285601 | A1* | 12/2006 | Julian et al. | 370/208 |
| 2007/0064669 | A1* | 3/2007 | Classon et al. | 370/347 |
| 2007/0076587 | A1* | 4/2007 | Kwon et al. | 370/208 |
| 2007/0117570 | A1* | 5/2007 | Noh et al. | 370/208 |
| 2007/0121547 | A1* | 5/2007 | Huh et al. | 370/329 |
| 2007/0211616 | A1* | 9/2007 | Khandekar et al. | 370/203 |
| 2007/0230405 | A1* | 10/2007 | Yin et al. | 370/208 |
| 2008/0080459 | A1* | 4/2008 | Kotecha et al. | 370/342 |
| 2008/0085718 | A1* | 4/2008 | Kuchibhotla et al. | 455/452.1 |
| 2008/0247337 | A1* | 10/2008 | Li et al. | 370/280 |
| 2008/0293355 | A1* | 11/2008 | Giloh | 455/3.02 |
| 2009/0028103 | A1* | 1/2009 | Wang et al. | 370/329 |
| 2009/0059860 | A1* | 3/2009 | Maltsev et al. | 370/330 |
| 2009/0149187 | A1* | 6/2009 | Miki et al. | 370/330 |
| 2009/0290563 | A1* | 11/2009 | Gu et al. | 370/338 |
| 2009/0303913 | A1* | 12/2009 | Yu et al. | 375/267 |

OTHER PUBLICATIONS

International Search Report and Written Opinion for Related Application No. PCT/IB2008/000063 received on Sep. 18, 2008, p. 1-13.
Office Action received in corresponding Chinese Application No. 200880006093.1, Dated Oct. 18, 2011, 14 pages.
Chinese Office Action, dated Aug. 31, 2012; Issued on corresponding Application No. 200880006093.1.
Office Action dated Mar. 7, 2013 issued in corresponding Chinese Patent Application No. 200880006093.1.
Office Action mailed Sep. 6, 2013, issued in corresponding CN Patent Appln No. 200880006093.1 (with English translation).
Office Action dated Mar. 5, 2014, issued in corresponding CN Patent Application No. 200880006093.1.

* cited by examiner

METHOD AND APPARATUS FOR PROVIDING AUTOMATIC CONTROL CHANNEL MAPPING

RELATED APPLICATION

This application was originally filed as PCT Application No. PCT/IB2008/000063 on Jan. 11, 2008 and claims priority to U.S. Provisional Application No. 60/884,759 filed on Jan. 12, 2007, which is incorporated herein by reference in its entirety.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves efficient design of control signaling within the communication system.

Some Exemplary Embodiments

Therefore, there is a need for an approach for providing efficient control signaling, which can co-exist with already developed standards and protocols.

According to one embodiment of the invention, a method comprises receiving a sub-set of channel parameters. The method also comprises automatically mapping control channels to physical resources of a communication network according to the received channel parameters.

According to another embodiment of the invention, an apparatus comprises a mapper configured to receive a sub-set of channel parameters, and to automatically map control channels to physical resources of a communication network according to the received channel parameters.

According to another embodiment of the invention, a method comprises determining location of one of a plurality of coded control channels established over a multiple input multiple output (MIMO) communication system by automatically mapping the control channels to a plurality of sub-carriers designated for use within the system, wherein the sub-carriers are allocated to a plurality of transmission symbols that include Orthogonal Frequency Division Multiplexing (OFDM) symbols.

According to yet another embodiment of the invention, an apparatus comprises a mapper configured to determine location of one of a plurality of coded control channels established over a multiple input multiple output (MIMO) communication system by automatically mapping the control channels to a plurality of sub-carriers designated for use within the system.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENTS

An apparatus, method, and software for providing an efficient control signaling are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a communication network having a Third Generation Partnership Project (3GPP) Long Term Evolution (LTE) architecture, it is recognized by one of ordinary skill in the art that the embodiments of the inventions have applicability to any type of communication system (e.g., the systems of FIGS. 8-10) and equivalent functional capabilities.

Figure 1:
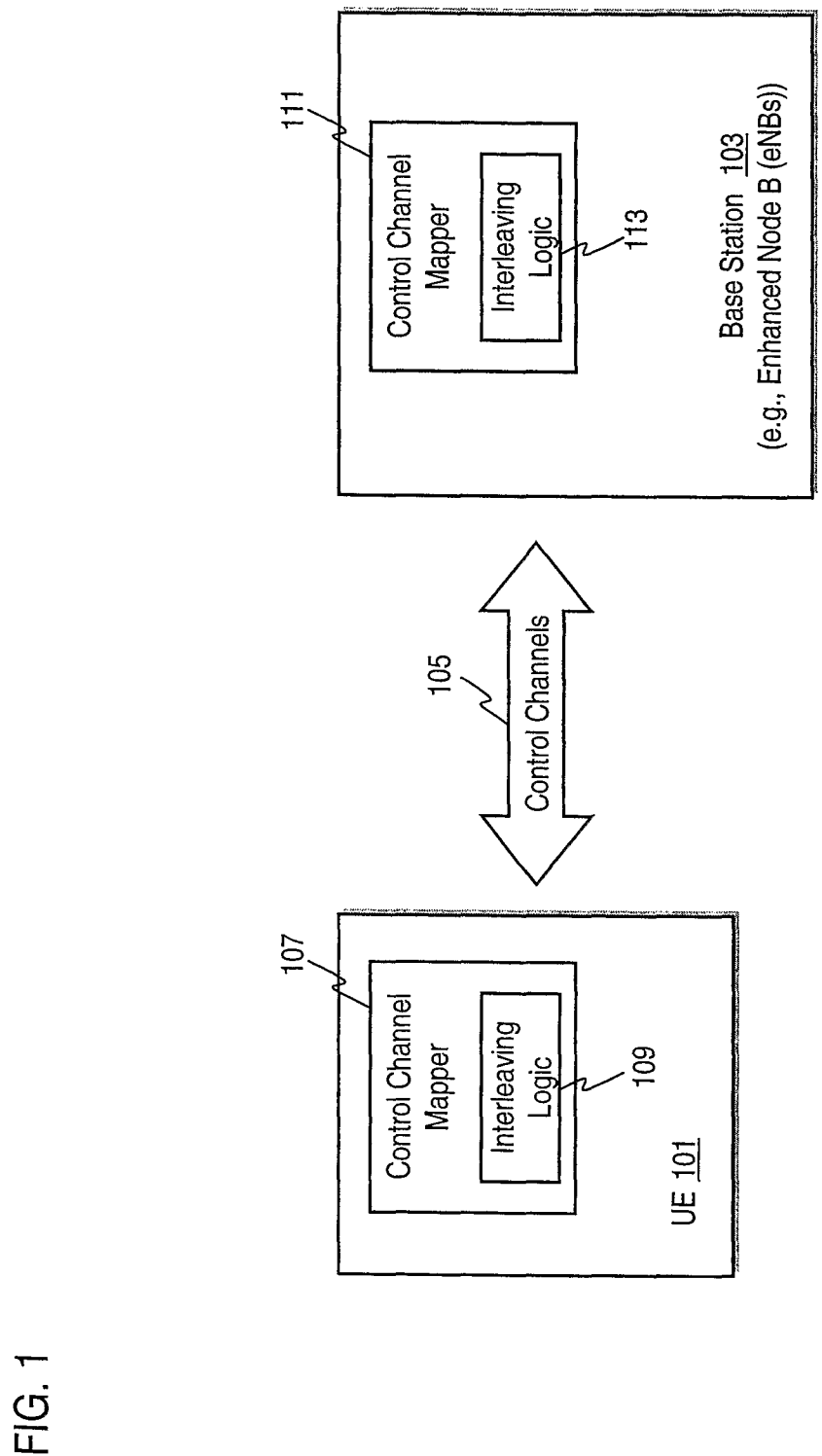
FIG. 1 is a diagram of a user equipment (UE) and a base station, each configured to perform automatic control channel mapping, according to an exemplary embodiment of the invention.

FIG. 1 is a diagram of a user equipment (UE) and a base station, each configured to perform automatic control channel mapping, according to an exemplary embodiment of the invention. As shown, a user equipment (UE) 101 communicates with a base station 103, which under the 3GPP LTE architecture is denoted as an enhanced Node B (eNB) 103. The UE 101 can be any type of mobile stations, such as handsets, terminals, stations, units, devices, or any type of interface to the user (such as "wearable" circuitry, etc.). By way of example, the communication of FIG. 1 utilizes an architecture compliant with the long term evolution (LTE) of Universal Mobile Telecommunications System (UMTS) terrestrial radio access network (UTRAN) in 3GPP; this architecture is more fully described below with respect to FIGS. 2A-2D. Control channel signaling 105 plays an important role for ensuring timely and accurate delivery of information. Such signaling is supported by one or more control channels 105.

It is recognized that one of the challenges in constructing a set of separately coded control channels is that the UE 101 will need to know where these control channels 105 are located in the time/frequency domain, for example. Accordingly, the UE 101 includes a control channel mapper 107, in conjunction with an interleaving logic 109 that maps these control channels 105 using a predetermined algorithm for distributing the channels into the set of physical resources. In an exemplary embodiment, the eNB 103 can also perform the mapping function through a control channel mapper 111, which can utilized an interleaving logic 113 as part of the mapping function.

The eNB 103 utilizes a Multiple Input Multiple Output (MIMO) antenna system; for instance, the eNB 103 can provide two antenna transmit and receive capabilities. This arrangement supports the parallel transmission of independent data streams to achieve high data rates. On the downlink, the eNB 103 can utilize Orthogonal Frequency Division Multiplexing (OFDM), while Single Carrier Frequency Division Multiple Access (FDMA) (SC-FDMA) is used for the uplink.

The control channel mapper 107, 111 processes, for instance, a subset of system and cell level parameters, and (from these channel parameters) derive a distinct mapping from the time/frequency grid into logical control channels. In one embodiment, the mapping algorithm or scheme performed by the control channel mapper 107, 111 can acquire the information through a "push" mechanism on the network side using, e.g., system information, Radio Resource Control (RRC) messages, other types of cell-broadcast configuration, pre-determined by specifications, etc. Also, the control channel mapper 107, 111, in an exemplary embodiment, can derive data needed for constructing the bit-exact mapping of the different control channels (as described in FIGS. 5 and 6).

FIGS. 2A-2D are diagrams of communication systems having exemplary long-term evolution (LTE) architectures, in which the system of FIG. 1 can operate, according to various exemplary embodiments of the invention. By way of example (shown in FIG. 2A), the base station 103 and the UE 101 can communicate in system 200 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA.

The MME (Mobile Management Entity)/Serving Gateways 201 are connected to the eNBs 103 in a full or partial mesh configuration using tunneling over a packet transport network (e.g., Internet Protocol (IP) network) 203. Exemplary functions of the MME/Serving GW 201 include distribution of paging messages to the eNBs 103, IP header compression, termination of U-plane packets for paging reasons, and switching of U-plane for support of UE mobility. Since the GWs 201 serve as a gateway to external networks, e.g., the Internet or private networks 203, the GWs 201 include an Access, Authorization and Accounting system (AAA) 205 to securely determine the identity and privileges of a user and to track each user's activities. Namely, the MME Serving Gateway 201 is the key control-node for the LTE access-network and is responsible for idle mode UE tracking and paging procedure including retransmissions. Also, the MME 201 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 2A:
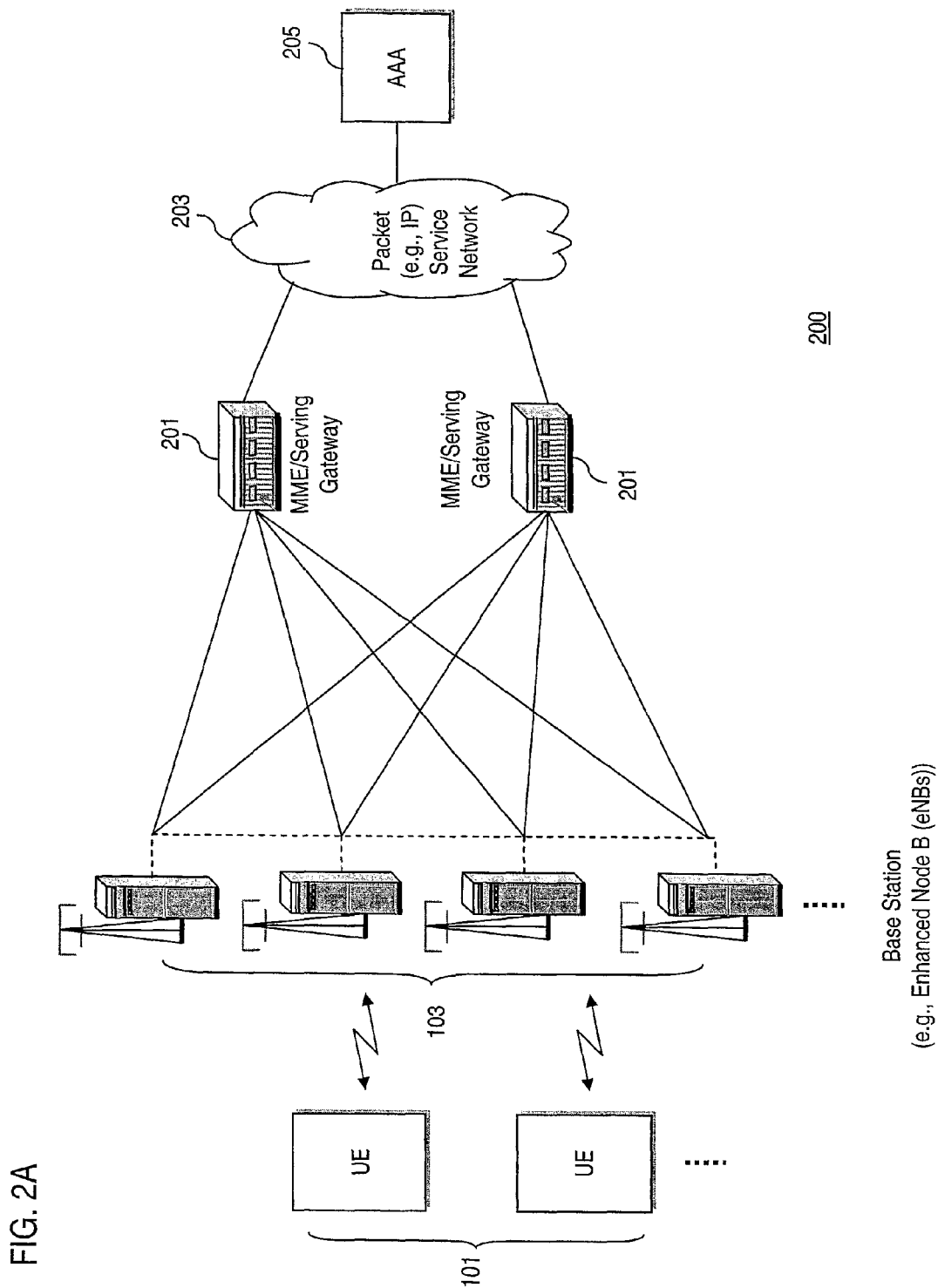
FIGS. 2A-2D are diagrams of communication systems having exemplary long-term evolution (LTE) architectures, in which the system of FIG. 1 can operate, according to various exemplary embodiments of the invention.
Figure 2B:
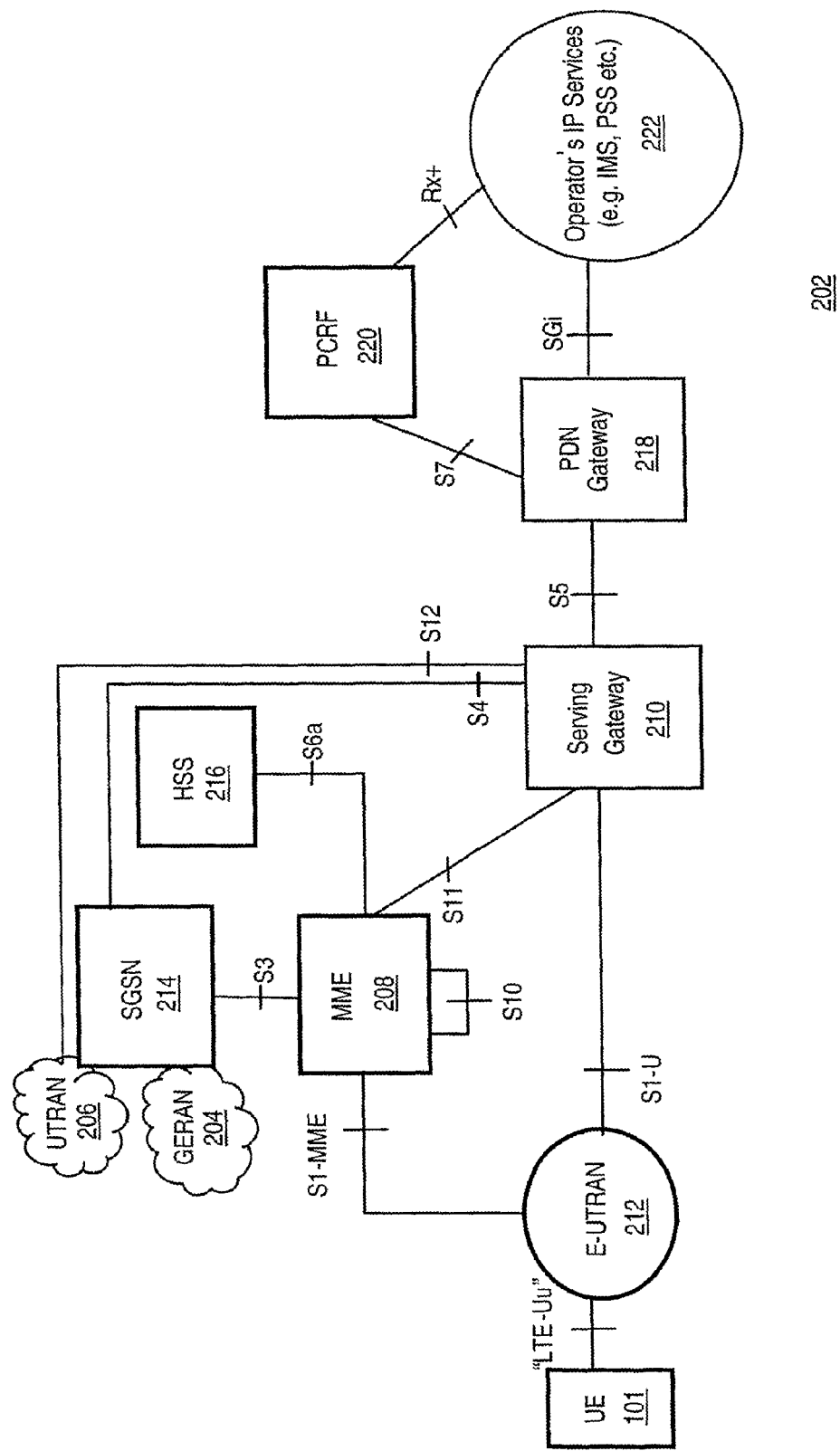

In FIG. 2B, a communication system 202 supports GERAN (GSM/EDGE radio access) 204, and UTRAN 206 based access networks, E-UTRAN 212 and non-3GPP (not shown) based access networks, and is more fully described in TR 23.882, which is incorporated herein by reference in its entirety. A key feature of this system is the separation of the network entity that performs control-plane functionality (MME 208) from the network entity that performs bearer-plane functionality (Serving Gateway 210) with a well defined open interface between them S11. Since E-UTRAN 212 provides higher bandwidths to enable new services as well as to improve existing ones, separation of MME 208 from Serving Gateway 210 implies that Serving Gateway 210 can be based on a platform optimized for signaling transactions. This scheme enables selection of more cost-effective platforms for, as well as independent scaling of, each of these two elements. Service providers can also select optimized topological locations of Serving Gateways 210 within the network independent of the locations of MMEs 208 in order to reduce optimized bandwidth latencies and avoid concentrated points of failure.

The basic architecture of the system 202 contains following network elements. As seen in FIG. 2B, the E-UTRAN (e.g., eNB) 212 interfaces with UE 101 via LTE-Uu. The E-UTRAN 212 supports LTE air interface and includes functions for radio resource control (RRC) functionality corresponding to the control plane MME 208. The E-UTRAN 212 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 208, as a key control node, is responsible for managing mobility UE identifies and security parameters and paging procedure including retransmissions. The MME 208 is involved in the bearer activation/deactivation process and is also responsible for choosing Serving Gateway 210 for the UE 101. MME 208 functions include Non Access Stratum (NAS) signaling and related security. MME 208 checks the authorization of the UE 101 to camp on the service provider's Public Land Mobile Network (PLMN) and enforces UE 101 roaming restrictions. The MME 208 also provides the control plane function for mobility between LTE and 2G/3G access networks with the S3 interface terminating at the MME 208 from the SGSN (Serving GPRS Support Node) 214.

The SGSN 214 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 208 and HSS (Home Subscriber Server) 216. The S10 interface between MMEs 208 provides MME relocation and MME 208 to MME 208 information transfer. The Serving Gateway 210 is the node that terminates the interface towards the E-UTRAN 212 via S1-U.

The S1-U interface provides a per bearer user plane tunneling between the E-UTRAN 212 and Serving Gateway 210. It contains support for path switching during handover between eNBs 212. The S4 interface provides the user plane with related control and mobility support between SGSN 214 and the 3GPP Anchor function of Serving Gateway 210.

The S12 is an interface between UTRAN 206 and Serving Gateway 210. Packet Data Network (PDN) Gateway 218 provides connectivity to the UE 101 to external packet data networks by being the point of exit and entry of traffic for the UE 101. The PDN Gateway 218 performs policy enforcement, packet filtering for each user, charging support, lawful interception and packet screening. Another role of the PDN Gateway 218 is to act as the anchor for mobility between 3GPP and non-3GPP technologies such as WiMax and 3GPP2 (CDMA 1× and EvDO (Evolution Data Only)).

The S7 interface provides transfer of QoS policy and charging rules from PCRF (Policy and Charging Role Function) 220 to Policy and Charging Enforcement Function (PCEF) in the PDN Gateway 218. The SGi interface is the interface between the PDN Gateway and the operator's IP services including packet data network 222. Packet data network 222 may be an operator external public or private packet data network or an intra operator packet data network, e.g., for provision of IMS (IP Multimedia Subsystem) services. Rx+ is the interface between the PCRF and the packet data network 222.

Figure 2C:
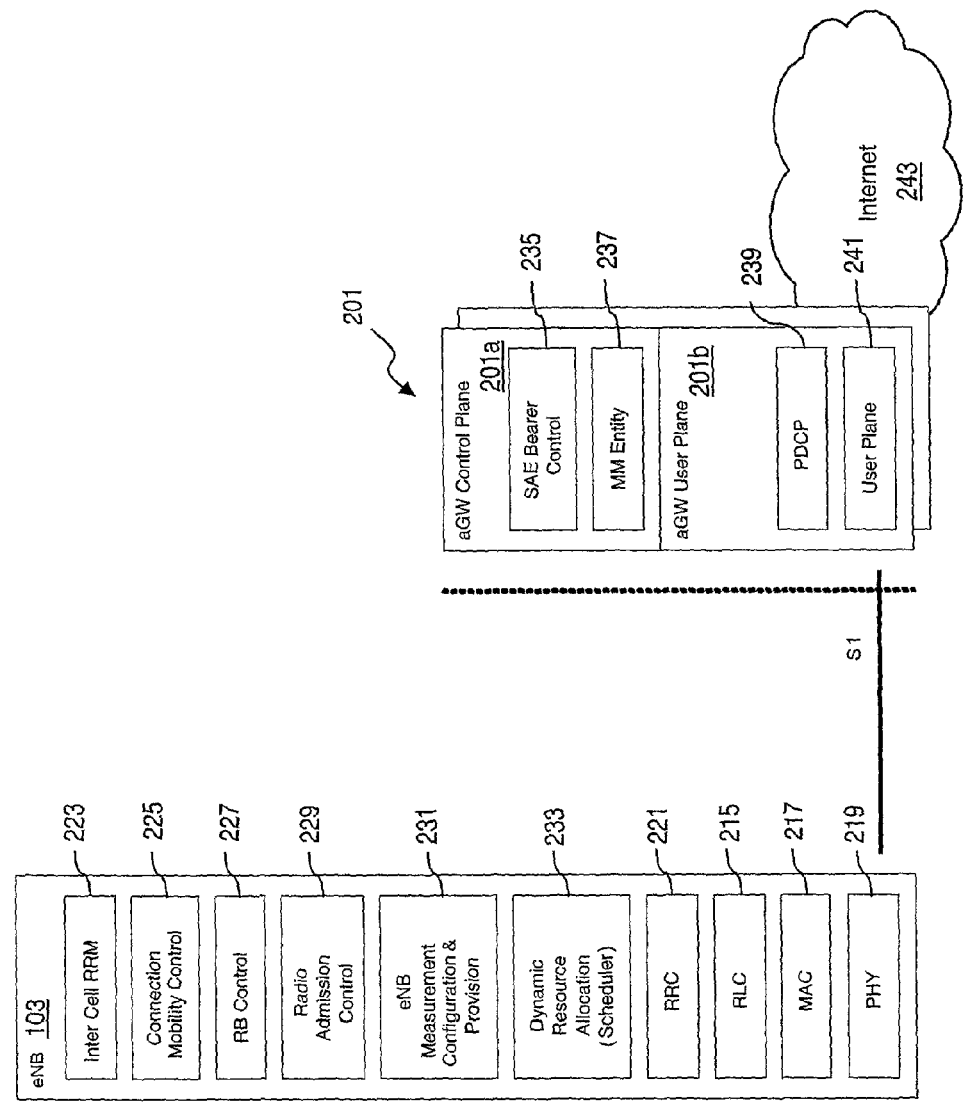

As seen in FIG. 2C, the eNB 103 utilizes an E-UTRA (Evolved Universal Terrestrial Radio Access) (user plane, e.g., RLC (Radio Link Control) 215, MAC (Media Access Control) 217, and PHY (Physical) 219, as well as a control plane (e.g., RRC 221)). The eNB 103 also includes the following functions: Inter Cell RRM (Radio Resource Management) 223, Connection Mobility Control 225, RB (Radio Bearer) Control 227, Radio Admission Control 229, eNB Measurement Configuration and Provision 231, and Dynamic Resource Allocation (Scheduler) 233.

The eNB 103 communicates with the aGW 201 (Access Gateway) via an S1 interface. The aGW 201 includes a User Plane 201a and a Control plane 201b. The control plane 201b provides the following components: SAE (System Architecture Evolution) Bearer Control 235 and MM (Mobile Management) Entity 237. The user plane 201b includes a PDCP (Packet Data Convergence Protocol) 239 and a user plane functions 241. It is noted that the functionality of the aGW 201 can also be provided by a combination of a serving gateway (SGW) and a packet data network (PDN) GW. The aGW 201 can also interface with a packet network, such as the Internet 243.

Figure 2D:
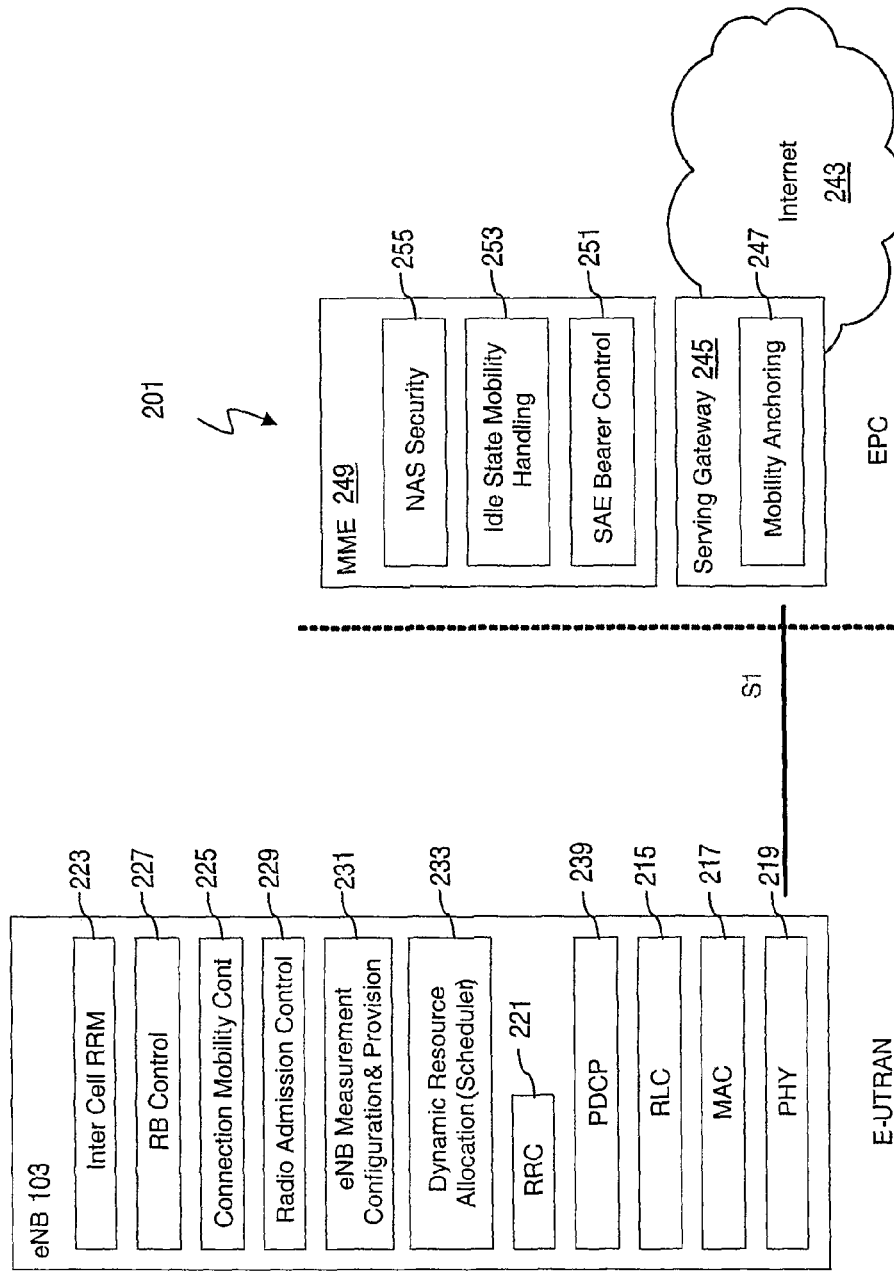

In an alternative embodiment, as shown in FIG. 2D, the PDCP (Packet Data Convergence Protocol) functionality can reside in the eNB 103 rather than the GW 201. Other than this PDCP capability, the eNB functions of FIG. 2C are also provided in this architecture.

In the system of FIG. 2D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 36.300.

The eNB 103 interfaces via the S1 to the Serving Gateway 245, which includes a Mobility Anchoring function 247. According to this architecture, the MME (Mobility Management Entity) 249 provides SAE (System Architecture Evolution) Bearer Control 251, Idle State Mobility Handling 253, NAS (Non-Access Stratum) Security 255.

Figure 3:
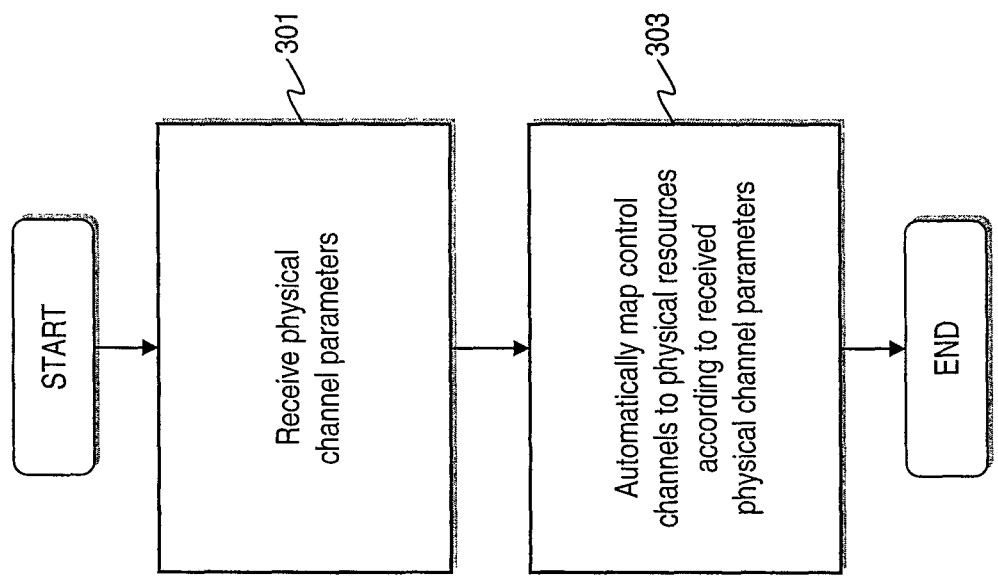
FIG. 3 is a flowchart of a process for mapping logical control channels to physical resources, in accordance with an embodiment of the invention.

FIG. 3 is a flowchart of a process for mapping logical control channels to physical resources, in accordance with an embodiment of the invention. This process is explained according to the system of FIG. 1. In step 301, a channel mapper 107, 111 receives the channel parameters. Then, the channel mapper 107, 111 automatically maps, per step 303, control channels to the physical resources according to the received channel parameters. In an exemplary embodiment, the logical control channels are depicted in FIG. 4A.

Figure 4A:
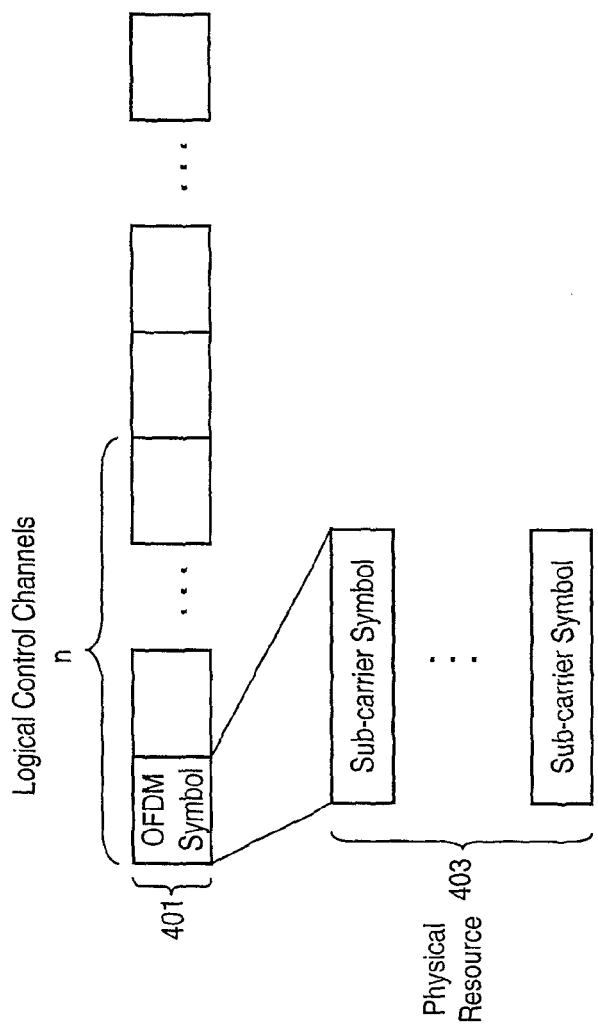
FIG. 4 is a diagram of a transmission frame providing control channels that are mapped to sub-carriers, in accordance with an embodiment of the invention.

FIG. 4A is a diagram of a transmission frame providing control channels that are mapped to sub-carriers, in accordance with an embodiment of the invention. Under this scenario, a frame 401 pertains to downlink (DL) control signaling. In one embodiment, the downlink control signaling information is located in the first n transmission symbols 403; e.g., n≤3 within a transmission time interval (TTI). It is contemplated that depending on the system configuration, n can be larger than 3. According to certain embodiments, the transmission symbols are OFDM symbols 403. The number of sub-carriers available in each OFDM symbol depends on the system bandwidth; for example, 600 sub-carriers are available in a 10 MHz system bandwidth within the context of LTE of 3GPP.

Figure 4B:
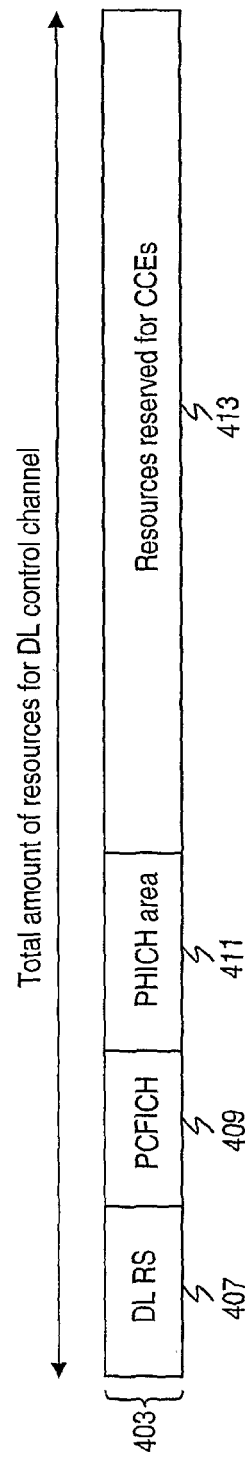
Figure 4C:
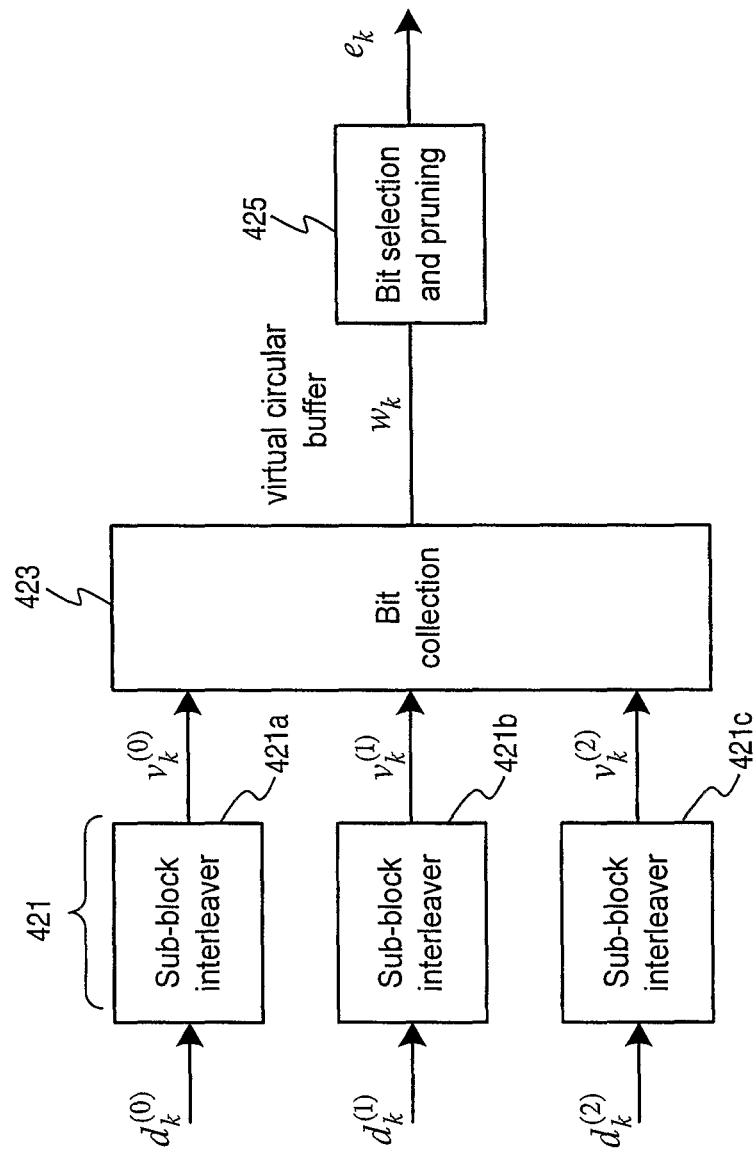

In an exemplary embodiment, a number of resources (RE) 403 are available within the first 'n' OFDM symbols 405 within the TTI. As seen in FIG. 4B, these resources can be divided between reference symbols 407, PCFICH (Physical Control Format Indication Channel) 409, PHICH (Physical Hybrid Automatic Repeat Request Indicator Channel) 411 and CCEs (Control Channel Elements) 413 for control channel candidates potentially carrying PDCCHs (Packet Data Control Channels). The PCFICH indicates to the UE 101 whether the control channel occupies 1, 2, or 3 OFDM symbols; accordingly, the approach utilizes an interleaver (as in FIG. 4C) that is able to adjust the parameters according to this setting. In this overall structure, the resources for reference symbols (depending on the number of transmit antennas) within the first 'n' OFDM symbols as well as the PCFICH resources 409 are mapped to the first OFDM symbol of the TTI, while the PHICH resources are mapped according to the semi-static configuration of the PHICH. The CCE blocks 413 are mapped to the 'n' OFDM symbols using a mapping functionality to provide diversity in both time and frequency.

It is noted that the number of transmit antennas for transmit diversity impacts the number of used reference symbols. The amount and positioning of the reference symbols for each transmit antenna can be predetermined.

In this example, it is assumed that the data transmission in the downlink can, at earliest, start at the same OFDM symbol as when the control signaling ends. According to one embodiment, multiple control channels are used, wherein each control channel is convolutionally coded, for example. The UE 101 can monitor the number of control channels. The number of control channels can be specified implicitly or be a cell specific parameter as a function of n. In an exemplary embodiment, one control channel carries information for one MAC (Medium Access Control) ID, and at least two formats (MCS) for control signaling is supported. Further, the power setting of each control channel can be specified by the Node B 103.

The coded size of the control channel is a function of the uncoded size of a single control channel and the corresponding effective code rate of the control channel. The amount and position of dedicated 'per-cell' control information (ACK/NACK channels, PCFICH information, Paging indicator channel, etc) can be a constant size; and potentially pre-specified or be a function of system or cell-specific parameters (e.g., system bandwidth).

For the purposes of illustration, the communication system of FIG. 1 is described and possesses the following characteristics: 10 MHz system (600 sub-carriers per OFDM symbol), 2 transmit antennas, and 80 symbols dedicated for other control information, and 3 OFDM symbols dedicated for control channel signaling (n=3). Based on this configuration, the channel mapper provides a mapping of the N separate control channels into sub-carrier symbols.

One approach for this mapping is as follows. A numbering scheme is created such that the sub-carrier symbols in the first OFDM symbol are denoted 0-599, the sub-carrier symbols in the second OFDM symbol are denoted 600-1199 (for 10 MHz system BW), and so on. From this sequence ranging from 0-1799, the symbols that are actually available for control (1520 from the calculation above) are extracted. By removing these entries, the sequence can be re-numbered to be within the range from 0 to 1519.

The mapping process divides the resources in an equal manner among the number of allocated control channels (e.g., 9). This number is denoted 'k'. The control channel mapper can utilize an assignment algorithm that allocates the following bits to control channel number 'x', where 'x' in this example can take the values from 0 to 8 (e.g., 80 user bits with an effective code rate of 0.25, and Quadrature Phase Shift Keying (QPSK) would require 160 symbols for transmission), as in Table 1 below:

TABLE 1

| Index of the per-user symbol sequence | Relative index on the physical channel |
|---|---|
| 0 | 0 * k + x |
| 1 | 1 * k + x |
| 2 | 2 * k + x |
| 3 | 3 * k + x |
| 4 | 4 * k + x |
| ... | ... |
| 158 | 158 * k + x |
| 159 | 159 * k + x |

In this way, the mapping process ensures that all the control channels (that are distributed over the full system bandwidth) achieve the full frequency diversity, while at the same time ensuring the mapping scheme is simplified. In order to allow for optimum power scaling, an interleaving scheme is utilized by the control channel mapper, such that the sub-carrier symbols that are not being used are divided equally over the OFDM symbols, thus potentially freeing power from the unused or low transmit power control channels in an equal manner.

The described process provides remapping functionality from some logical control channels, which are coded for transmission to a set of physical channel bits. To perform this mapping, the number of available channel symbols or bits is known. The main requirement for this is to know the number of sub-carrier symbols per OFDM symbol and the number of OFDM symbols reserved for the control channel. These parameters are either known (sub-carrier symbols per OFDM symbol), or signaled/network defined (the number of OFDM symbols for the control channel). Also, the number of sub-carrier symbols that are not available for transmission of control channel information (reference symbols, PCFICH information, ACK/NACK channels, etc) are known. From the above information, the number of sub-carrier symbols available for transmission of control information can be extracted (the number of channel bits available can also be extracted when the modulation scheme is known).

In one embodiment, the remapping functionality can utilize a block interleaver (e.g., as in the system, which provides a distribution over time and frequency of each of the control channels. This could be performed in various different ways. For example, one approach utilizes the interleaver in such a way that: the number of available physical channel bits is denoted as "x"; the number of OFDM symbols reserved is denoted "n"; and a system parameter—a block size parameter is denoted "m". A matrix (or block) is created with n*m rows, and ceil(x/(n*m)) columns. The (potential downlink) allocation information can be written into the matrix in a sequential manner (filling each row at a time). When all the downlink allocation information has been written into the matrix, the uplink allocation information is written from the "other end" of the matrix (starting from the last element in the matrix, and going from right to left). When the last row has been filled, the second last row is written in the same manner, and so on.

A number of elements in the matrix are not used for various reasons; e.g., too many elements in the matrix due to the ceil operation, or not enough elements in the control signaling. These will be known when filling the matrix.

According to one embodiment, the reading from the matrix is performed on a per-column manner (potentially with a permutation of the columns—as normally performed for a traditional block interleaver, see 3GPP 25.212, entitled "Technical Specification Group Radio Access Network; Multiplexing and Channel Coding (FDD)," which is incorporated herein by reference in its entirety). After the reading out of the matrix, the bits are mapped directly to the subcarrier symbols in a sequential manner (first filling the first OFDM symbol—omitting writing to the reserved sub-carrier symbols), until all OFDM control symbols are filled. The unused elements in the interleaver 109 and 113 (due to the ceil function) are not read from the interleaver 109 and 113.

It is noted that in addition to per-bit level operation, the mapping process can operate on a per-symbol level (placement of the modulator relative to the interleaver). The mapping scheme thus allows the UE 101 and network to automatically position the separately coded control channels on the available physical resources in a simple and pre-determined manner.

A central element for the control channel 105 is the resource element, which is a sub-carrier symbol; as such any operation/definition related to the control channel can be defined in terms of symbols. On one hand, the control channel is constructed such that the PDCCH payload is known by the e-Node B 103, and at least partly known by the UE 101 (the UE at least knows a set of options for the payload size). On the other hand, a CCE size 413, which is well-defined and know at both ends. This means that there is rate matching between coded payload size and physical channel capacity. The rate matching functionality is further detailed in 3GPP TR 36.212, entitled "Evolved Universal Terrestrial Radio Access (E-UTRA); Multiplexing and Channel Coding," which is incorporated herein by reference in its entirety. The rate matching functionality is explained as follows.

In accordance with one embodiment, a rate matching block utilizes a tail biting convolutionally coded block: $d_0^{(i)}$, $d_1^{(i)}$, $d_2^{(i)}$, $d_3^{(i)}$, ..., $d_{D-1}^{(i)}$, with i=0, 1, and 2, and where i is the coded stream index, and D is the number of bits in each coded stream. The rate matching can be performed by the components of FIG. 4C. This system provides rate matching for BCH (Broadcast Channel) and DL-CCH (Downlink Common Channel), in which three bit streams, $d_k^{(0)}$, $d_k^{(1)}$ and $d_k^{(2)}$, are interleaved using sub-block interleavers 421. The interleaved bits are input to a bit collection unit 423, which outputs a circular buffer to a bit selection and pruning unit 425.

Specifically, the bit stream $d_k^{(0)}$ is interleaved by the sub-block interleaver 421a, yielding an output sequence of $v_0^{(0)}$, $v_1^{(0)}$, $v_2^{(0)}$, ..., $v_{K_\pi-1}^{(0)}$. Likewise, the sub-block interleavers 421b and 421c output $v_0^{(1)}$, $v_1^{(1)}$, $v_2^{(1)}$, ..., $v_{K_\pi-1}^{(1)}$ and $v_0^{(2)}$, $v_1^{(2)}$, $v_2^{(2)}$, ..., $v_{K_\pi-1}^{(2)}$, respectively. The output bit sequence from the block interleaver can be derived as follows:

(1) Assign C=32 to be the number of columns of the matrix. The columns of the matrix are numbered 0, 1, 2, ..., C−1 from left to right. Table 2 provides the inter-column permutation pattern for the sub-block interleavers 421.

TABLE 2

| Number of columns C | Inter-column permutation pattern <P(0), P(1), ..., P(C−1)> |
|---|---|
| 32 | <1, 17, 9, 25, 5, 21, 13, 29, 3, 19, 11, 27, 7, 23, 15, 31, 0, 16, 8, 24, 4, 20, 12, 28, 2, 18, 10, 26, 6, 22, 14, 30> |

(2) Determine the number of rows of the matrix, R, by finding minimum integer R such that: D≤(R×C). The rows of rectangular matrix are numbered 0, 1, 2, ..., R−1 from top to bottom.

(3) If R×C>D, then $N_D$=(R×C−D) dummy bits are padded such that $y_k$=<NULL> for k=0, 1, ..., $N_D$−1. Then, write the input bit sequence, i.e., $y_{N_D+k}=d_k^{(i)}$, k=0, 1, ..., D−1, into the R×C matrix row by row starting with bit $y_0$ in column 0 of row 0:

$$\begin{bmatrix} y_0 & y_1 & y_2 & \cdots & y_{C-1} \\ y_C & y_{C+1} & y_{C+2} & \cdots & y_{2C-1} \\ \vdots & \vdots & \vdots & \ddots & \vdots \\ y_{(R-1)\times C} & y_{(R-1)\times C+1} & y_{(R-1)\times C+2} & \cdots & y_{(R\times C-1)} \end{bmatrix}$$

(4) Perform the inter-column permutation for the matrix based on the pattern $\langle P(j) \rangle_{j \in \{0, 1, ..., C-1\}}$ that is shown in Table 1, where P(j) is the original column position of the j-th permuted column. After permutation of the columns, the inter-column permuted R×C matrix is equal to $$\begin{bmatrix} y_{P(0)} & y_{P(1)} & y_{P(2)} & \cdots & y_{P(C-1)} \\ y_{P(0)+C} & y_{P(1)+C} & y_{P(2)+C} & \cdots & y_{P(C-1)+C} \\ \vdots & \vdots & \vdots & \ddots & \vdots \\ y_{P(0)+(R-1)\times C} & y_{P(1)+(R-1)\times C} & y_{P(2)+(R-1)\times C} & \cdots & y_{P(C-1)+(R-1)\times C} \end{bmatrix}$$

(5) The output of the block interleaver 421 is the bit sequence read out column by column from the inter-column permuted R×C matrix. The bits after sub-block interleaving are denoted by $v_0^{(i)}$, $v_1^{(i)}$, $v_2^{(i)}$, ..., $v_{K_\pi-1}^{(i)}$, where $v_0^{(i)}$ corresponds to $y_{P(0)}$, $v_1^{(i)}$ to $y_{P(0)+C}$, ... and $K_\pi$=(R×C).

With respect to the bit collection performed by the unit 423, the circular buffer of length $K_w$=3$K_\pi$ is generated as follows.

$w_k = v_k^{(0)}$ for k=0, ..., $K_\pi$−1

$w_{K_\pi+k} = v_k^{(1)}$ for k=0, ..., $K_\pi$−1

$w_{2K_\pi+k} = v_k^{(2)}$ for k=0, ..., $K_\pi$−1

Denoting by E the rate matching output sequence length, the rate matching output bit sequence is $e_k$, k=0, 1, ..., E−1. Table 2 provides the scheme for generating E.

$K_\pi$ is defined in Table 3, below.

TABLE 3

```
Set k = 0 and j = 0
while { k < E }
    if $w_{j mod K_w}$ ≠<NULL>
    $e_k$ = $w_{j mod K_w}$
    k = k + 1
    end if
        j = j + 1
end while
```

Figure 5:
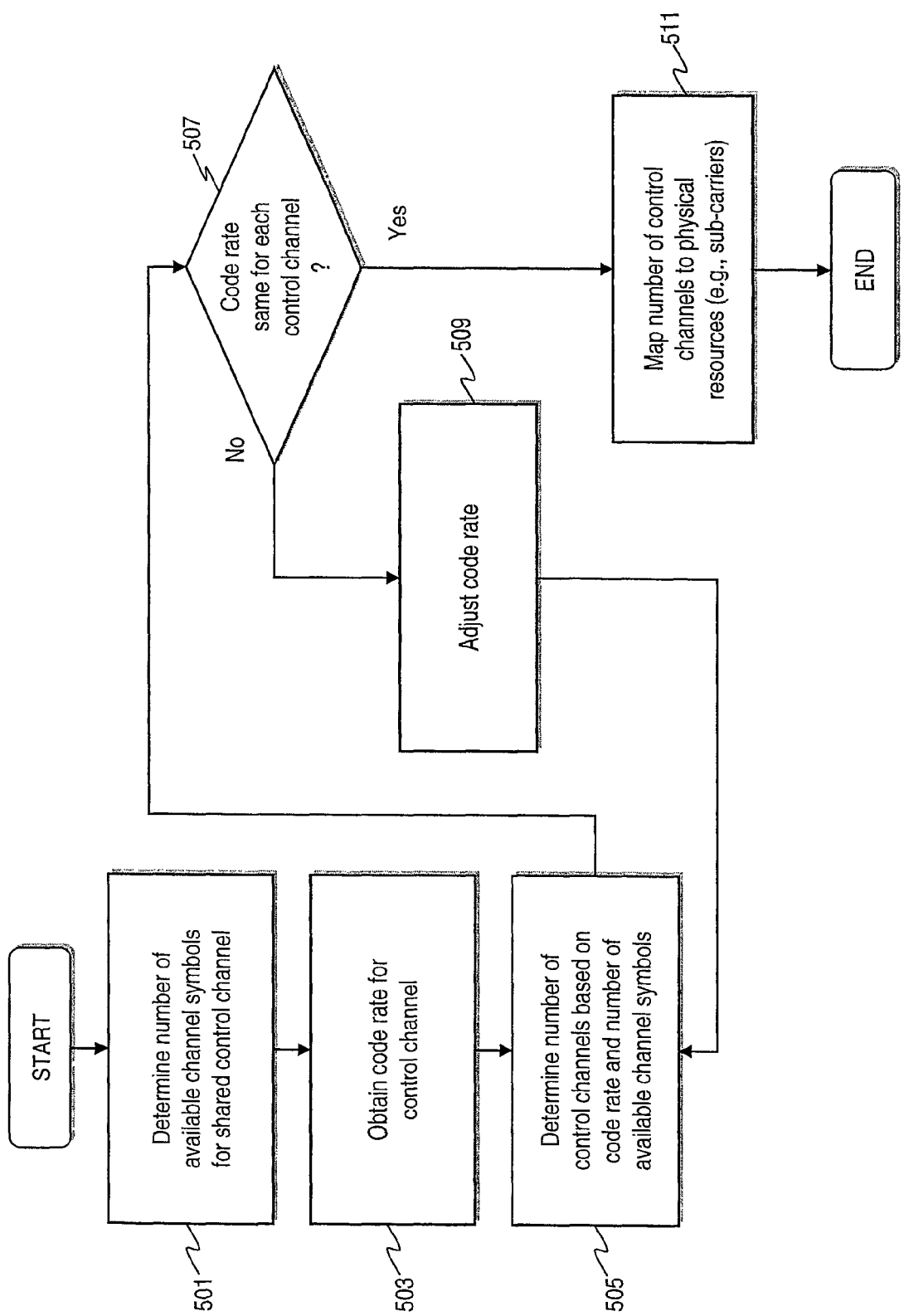
FIG. 5 is a flowchart of process for determining the number of available control channels, in accordance with an embodiment of the invention.

FIG. 5 is a flowchart of process for determining the number of available control channels, in accordance with an embodiment of the invention. In step 501, the number of available channel symbols for the shared control channel is determined. Next, as in step 503, the code rate for the control channel is obtained; in an exemplary embodiment, this code rate can be a predetermined, configurable value. Per step 505, the number of control channels can be determined based on the code rate and the number of available channel symbols.

Thereafter, in step 507, the process determines whether the code rate is the same for each control channel; if not, the code rate is adjusted, per step 509. Otherwise, the number of control channels is mapped to the physical resources (e.g., sub-carriers), per step 511.

The above process is now explained with respect to the following example. In this example, the following assumptions are made: number of control symbols, 'n'=3; system bandwidth (BW)=10 MHz meaning that we have 600 sub-carriers available per OFDM symbol; and number of transmit antennas is 2. Additionally, the reference symbols are placed according to 3GPP TS 36.211 (i.e., 100 symbols are used for reference symbols for each antenna—200 in total); 3GPP TS 36.211, entitled "Evolved Universal Terrestrial Radio Access (E-UTRA); Physical Channels and Modulation," which is incorporated herein by reference in its entirety. The uncoded size of the downlink allocation is, for example, 80 bits (this value depends on the system BW). Also, the effective code rate of control channel is 0.25 (target of ¼ for coverage).

It is noted that the desired number of control channels need not be specified, as the process attempts to exploit the control channel as much as possible. Further, it is assumed that the dedicated resources for other control channels is 80 symbols.

Based on the above parameters, the number of available channel symbols for the shared control channel can be calculated as follows (total number of symbols in the control channel minus the symbols reserved for the other channels): (3*600)−200−80=1520, which corresponds to 3040 raw channel bits assuming QPSK as the modulation scheme. Assuming the effective code rate of 0.25 for the control channel, there are 760 (i.e., 3040*0.25) bits for the control channel. By division of the size of each control channel, 9.5 (i.e., 760/80) control channels result.

Accordingly, in order to fulfill the requirements for the effective code rate, 9 separately coded control channels can fit into the physical resources. At this point, the given effective code rate can be used (leaving the unused physical resources); otherwise, a recalculation can be performed using an adjusted code rate (obtain as the minimum for having exactly the same code rate of each control channel). The above process ensures that the channel coding parameters (rate matching) remain the same for each control channel.

Figure 6:
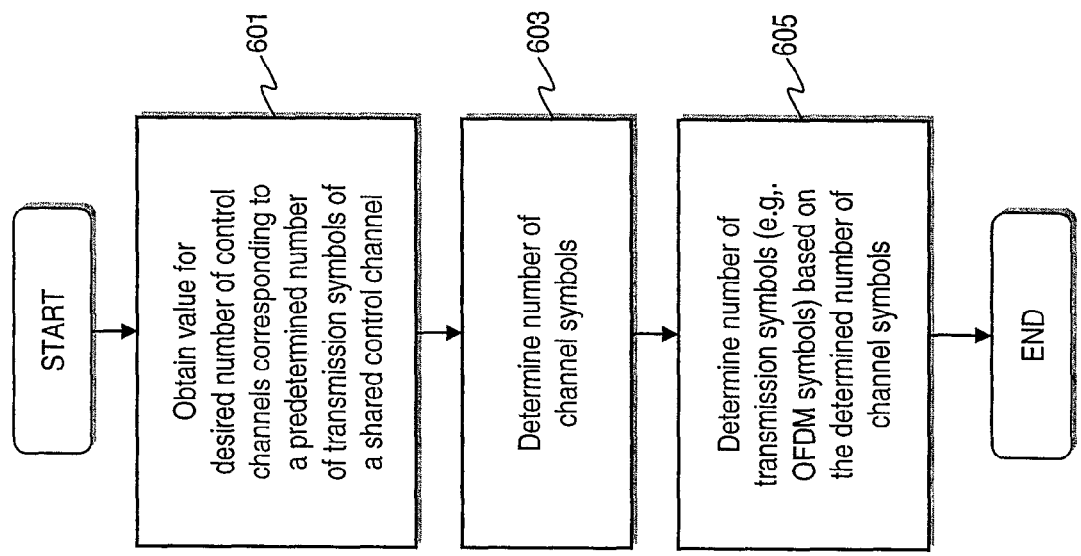
FIG. 6 is a flowchart of process for determining the number of transmission symbols for supporting a desired number of control channels, in accordance with an embodiment of the invention.

FIG. 6 is a flowchart of process for determining the number of transmission symbols for supporting a desired number of control channels, in accordance with an embodiment of the invention. In step 601, the value for the numbers of control channels corresponding to a predetermined number of transmission symbols of a shared control channel is obtained. Next, the number of channel symbols can be determined, per step 603. In step 605, the number of transmission symbols (e.g., OFDM symbols) can be determined based on the determined number of channel symbols.

Under this scenario, it is assumed that the number of OFDM symbols is the variable parameter (to be calculated from the other parameters). As with the example of FIG. 5, the following conditions are assumed: number of control symbols 'n' is unknown (however, non-integer values can be used, such as 2.5 symbols). The system bandwidth is 10 MHz (i.e., 600 sub-carriers available per OFDM symbol). The number of transmit antennas is 2 with 100 symbols are used for reference symbols for each antenna. Also, the uncoded size of a downlink allocation is 80 bits, and the effective code rate of control channel is 0.25 (target of ¼ for coverage). Further, the desired number of control channels is 7, and the dedicated resources for other control channels constitute 80 symbols.

Given these parameters, the required number of OFDM symbols for the control channel can be determined by performing the calculation backwards. For example, the number of a coded control channel bits can be 320 (i.e., 80/0.25); and with QPSK, this yields 160 channel symbols. Assuming that 7 channels are desired, the number of channel symbols total 1120 (i.e., 7*160) symbols for the full control channel. Factoring in the overhead for the reference signal and other channels, the total number of channel symbols is 1400 (i.e., 1120+200+80). With the number of sub-carrier symbols per OFDM symbol known, it can be determined that this corresponds to 2.333 OFDM symbols.

In summary, one of the following approaches can be adopted to perform control channel mapping. In one embodiment, a constant effective code rate is used, in which the remaining sub-carriers of the last OFDM control channel symbol are mapped to data capacity (control and data share an OFDM symbol in the transition region). Alternatively, the UE 101 uses an integer number of OFDM symbols for the control channel, and in a similar manner as the process of FIG. 5, merely adjusts the actual effective code rate to match the setup. Under either approach, the control channel mapper can automatically calculate the missing information element based on other information parts. That is, both the UE 101 and the e-Node B 103 have sufficient information to calculate the parameters needed to initialize the mapper properly.

One of ordinary skill in the art would recognize that the processes for control channel mapping may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 7.

Figure 7:
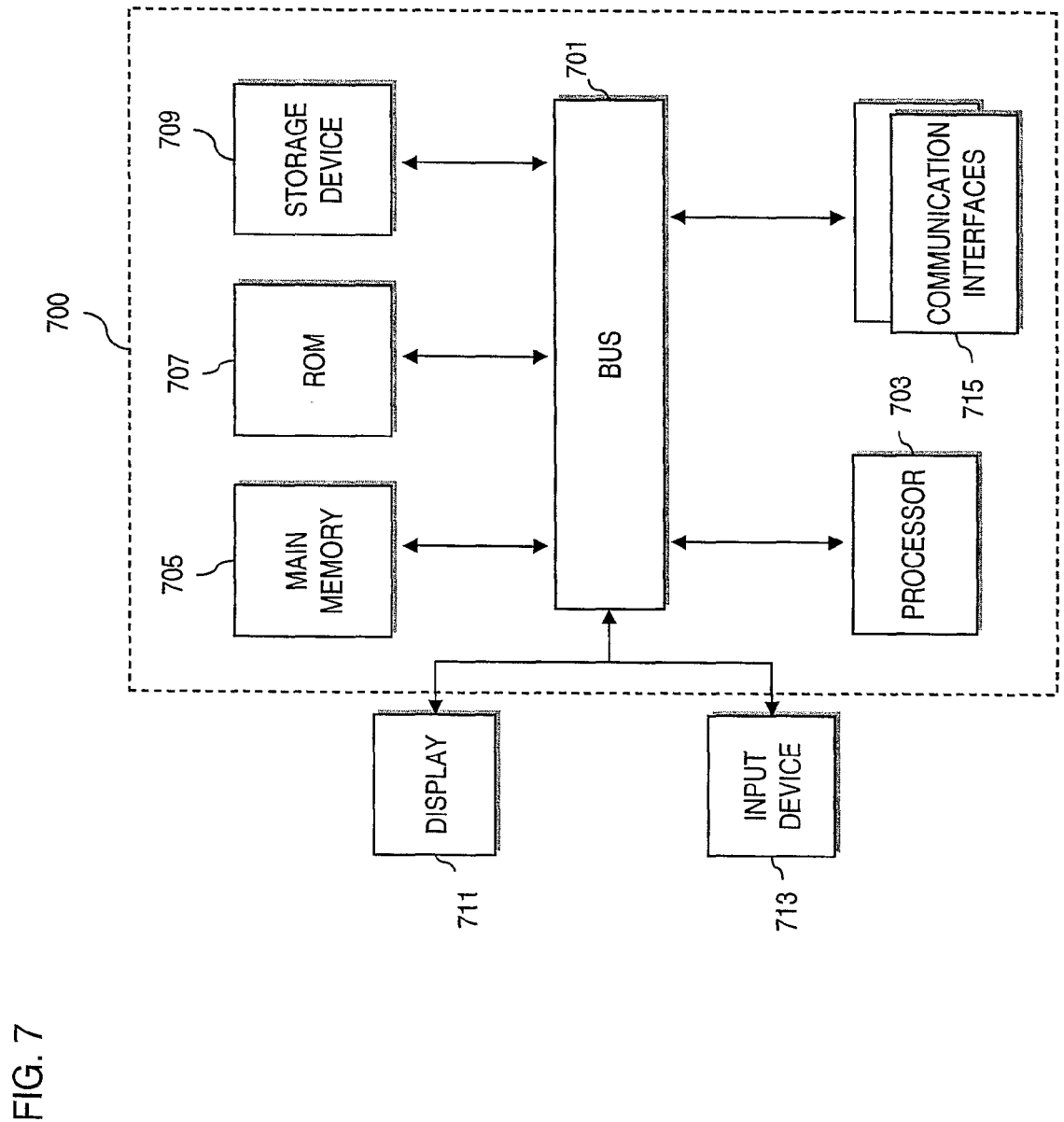
FIG. 7 is a diagram of hardware that can be used to implement an embodiment of the invention.

FIG. 7 illustrates exemplary hardware upon which various embodiments of the invention can be implemented. A computing system 700 includes a bus 701 or other communication mechanism for communicating information and a processor 703 coupled to the bus 701 for processing information. The computing system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computing system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computing system 700 may be coupled via the bus 701 to a display 711, such as a liquid crystal display, or active matrix display, for displaying information to a user. An input device 713, such as a keyboard including alphanumeric and other keys, may be coupled to the bus 701 for communicating information and command selections to the processor 703. The input device 713 can include a cursor control, such as a mouse, a trackball, or cursor direction keys, for communicating direction information and command selections to the processor 703 and for controlling cursor movement on the display 711.

According to various embodiments of the invention, the processes described herein can be provided by the computing system 700 in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 700 also includes at least one communication interface 715 coupled to bus 701. The communication interface 715 provides a two-way data communication coupling to a network link (not shown). The communication interface 715 sends and receives electrical, electromagnetic, or optical signals that carry digital data streams representing various types of information. Further, the communication interface 715 can include peripheral interface devices, such as a Universal Serial Bus (USB) interface, a PCMCIA (Personal Computer Memory Card International Association) interface, etc.

The processor 703 may execute the transmitted code while being received and/or store the code in the storage device 709, or other non-volatile storage for later execution. In this manner, the computing system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8A:
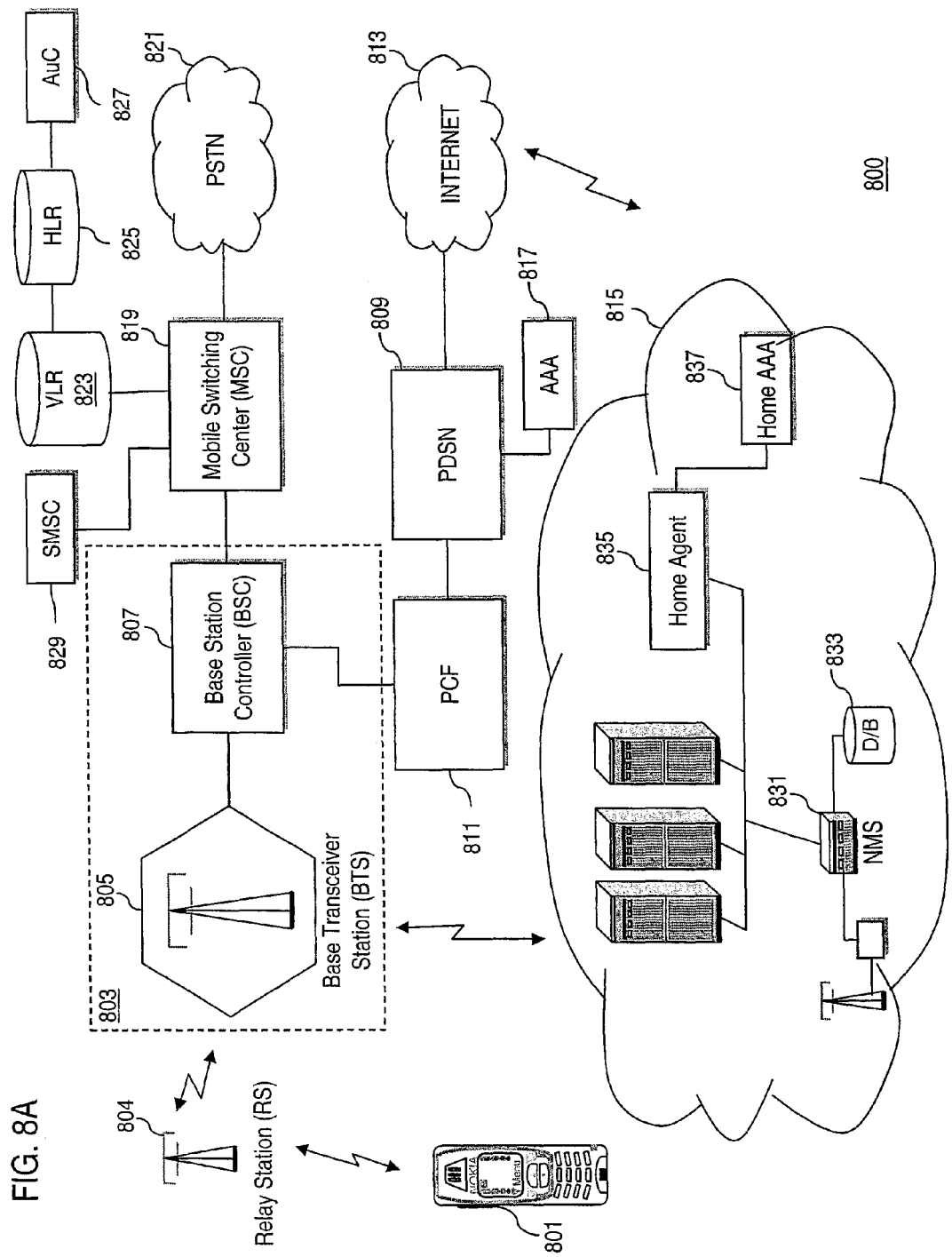
FIGS. 8A and 8B are diagrams of different cellular mobile phone systems capable of supporting various embodiments of the invention.
Figure 8B:
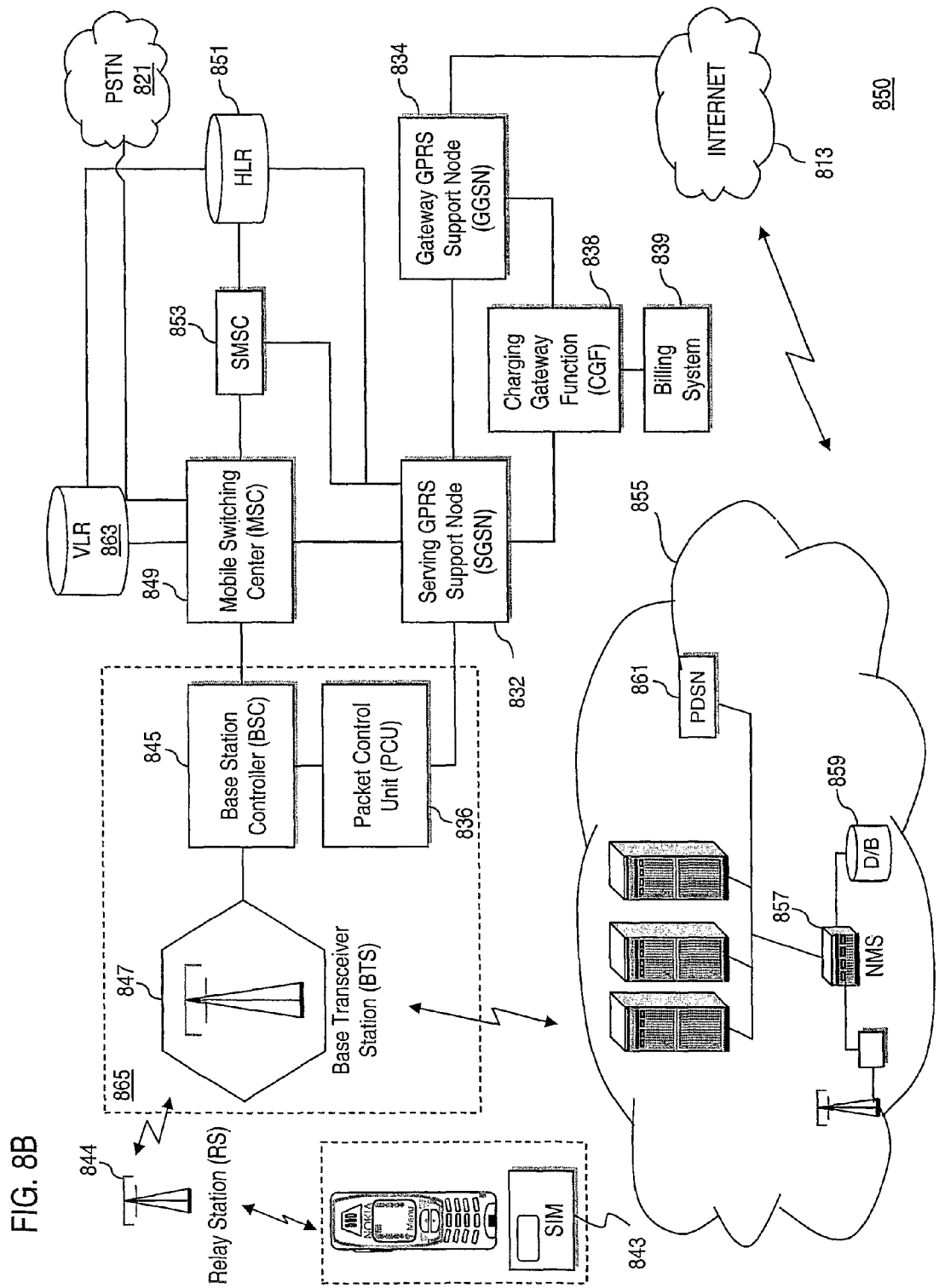

FIGS. 8A and 8B are diagrams of different cellular mobile phone systems capable of supporting various embodiments of the invention. FIGS. 8A and 8B show exemplary cellular mobile phone systems each with both mobile station (e.g., handset) and base station having a transceiver installed (as part of a Digital Signal Processor (DSP)), hardware, software, an integrated circuit, and/or a semiconductor device in the base station and mobile station). By way of example, the radio network supports Second and Third Generation (2G and 3G) services as defined by the International Telecommunications Union (ITU) for International Mobile Telecommunications 2000 (IMT-2000). For the purposes of explanation, the carrier and channel selection capability of the radio network is explained with respect to a cdma2000 architecture. As the third-generation version of IS-95, cdma2000 is being standardized in the Third Generation Partnership Project 2 (3GPP2).

A radio network 800 includes mobile stations 801 (e.g., handsets, terminals, stations, units, devices, or any type of interface to the user (such as "wearable" circuitry, etc.)) in communication with a Base Station Subsystem (BSS) 803 through a relay station (RS) 804. According to one embodiment of the invention, the radio network supports Third Generation (3G) services as defined by the International Telecommunications Union (ITU) for International Mobile Telecommunications 2000 (IMT-2000).

In this example, the BSS 803 includes a Base Transceiver Station (BTS) 805 and Base Station Controller (BSC) 807. Although a single BTS is shown, it is recognized that multiple BTSs are typically connected to the BSC through, for example, point-to-point links. Each BSS 803 is linked to a Packet Data Serving Node (PDSN) 809 through a transmission control entity, or a Packet Control Function (PCF) 811. Since the PDSN 809 serves as a gateway to external networks, e.g., the Internet 813 or other private consumer networks 815, the PDSN 809 can include an Access, Authorization and Accounting system (AAA) 817 to securely determine the identity and privileges of a user and to track each user's activities. The network 815 comprises a Network Management System (NMS) 831 linked to one or more databases 833 that are accessed through a Home Agent (HA) 835 secured by a Home AAA 837.

Although a single BSS 803 is shown, it is recognized that multiple BSSs 803 are typically connected to a Mobile Switching Center (MSC) 819. The MSC 819 provides connectivity to a circuit-switched telephone network, such as the Public Switched Telephone Network (PSTN) 821. Similarly, it is also recognized that the MSC 819 may be connected to other MSCs 819 on the same network 800 and/or to other radio networks. The MSC 819 is generally collocated with a Visitor Location Register (VLR) 823 database that holds temporary information about active subscribers to that MSC 819. The data within the VLR 823 database is to a large extent a copy of the Home Location Register (HLR) 825 database, which stores detailed subscriber service subscription information. In some implementations, the HLR 825 and VLR 823 are the same physical database; however, the HLR 825 can be located at a remote location accessed through, for example, a Signaling System Number 7 (SS7) network. An Authentication Center (AuC) 827 containing subscriber-specific authentication data, such as a secret authentication key, is associated with the HLR 825 for authenticating users. Furthermore, the MSC 819 is connected to a Short Message Service Center (SMSC) 829 that stores and forwards short messages to and from the radio network 800.

During typical operation of the cellular telephone system, BTSs 805 receive and demodulate sets of reverse-link signals from sets of mobile units 801 conducting telephone calls or other communications. Each reverse-link signal received by a given BTS 805 is processed within that station. The resulting data is forwarded to the BSC 807. The BSC 807 provides call resource allocation and mobility management functionality including the orchestration of soft handoffs between BTSs 805. The BSC 807 also routes the received data to the MSC 819, which in turn provides additional routing and/or switching for interface with the PSTN 821. The MSC 819 is also responsible for call setup, call termination, management of inter-MSC handover and supplementary services, and collecting, charging and accounting information. Similarly, the radio network 800 sends forward-link messages. The PSTN 821 interfaces with the MSC 819. The MSC 819 additionally interfaces with the BSC 807, which in turn communicates with the BTSs 805, which modulate and transmit sets of forward-link signals to the sets of mobile units 801.

As shown in FIG. 8B, the two key elements of the General Packet Radio Service (GPRS) infrastructure 850 are the Serving GPRS Supporting Node (SGSN) 832 and the Gateway GPRS Support Node (GGSN) 834. In addition, the GPRS infrastructure includes a Packet Control Unit PCU (836) and a Charging Gateway Function (CGF) 838 linked to a Billing System 839. A GPRS the Mobile Station (MS) 841 employs a Subscriber Identity Module (SIM) 843. Under this scenario, a relay station (RS) 844 provides extended coverage for the MS 841.

The PCU 836 is a logical network element responsible for GPRS-related functions such as air interface access control, packet scheduling on the air interface, and packet assembly and re-assembly. Generally the PCU 836 is physically integrated with the BSC 845; however, it can be collocated with a BTS 847 or a SGSN 832. The SGSN 832 provides equivalent functions as the MSC 849 including mobility management, security, and access control functions but in the packet-switched domain. Furthermore, the SGSN 832 has connectivity with the PCU 836 through, for example, a Frame Relay-based interface using the BSS GPRS protocol (BSSGP). Although only one SGSN is shown, it is recognized that that multiple SGSNs 831 can be employed and can divide the service area into corresponding routing areas (RAs). A SGSN/SGSN interface allows packet tunneling from old SGSNs to new SGSNs when an RA update takes place during an ongoing Personal Development Planning (PDP) context. While a given SGSN may serve multiple BSCs 845, any given BSC 845 generally interfaces with one SGSN 832. Also, the SGSN 832 is optionally connected with the HLR 851 through an SS7-based interface using GPRS enhanced Mobile Application Part (MAP) or with the MSC 849 through an SS7-based interface using Signaling Connection Control Part (SCCP). The SGSN/HLR interface allows the SGSN 832 to provide location updates to the HLR 851 and to retrieve GPRS-related subscription information within the SGSN service area. The SGSN/MSC interface enables coordination between circuit-switched services and packet data services such as paging a subscriber for a voice call. Finally, the SGSN 832 interfaces with a SMSC 853 to enable short messaging functionality over the network 850.

The GGSN 834 is the gateway to external packet data networks, such as the Internet 813 or other private customer networks 855. The network 855 comprises a Network Management System (NMS) 857 linked to one or more databases 859 accessed through a PDSN 861. The GGSN 834 assigns Internet Protocol (IP) addresses and can also authenticate users acting as a Remote Authentication Dial-In User Service host. Firewalls located at the GGSN 834 also perform a firewall function to restrict unauthorized traffic. Although only one GGSN 834 is shown, it is recognized that a given SGSN 832 may interface with one or more GGSNs 833 to allow user data to be tunneled between the two entities as well as to and from the network 850. When external data networks initialize sessions over the GPRS network 850, the GGSN 834 queries the HLR 851 for the SGSN 832 currently serving a MS 841.

The BTS 847 and BSC 845 manage the radio interface, including controlling which Mobile Station (MS) 841 has access to the radio channel at what time. These elements essentially relay messages between the MS 841 and SGSN 832. The SGSN 832 manages communications with an MS 841, sending and receiving data and keeping track of its location. The SGSN 832 also registers the MS 841, authenticates the MS 841, and encrypts data sent to the MS 841.

Figure 9:
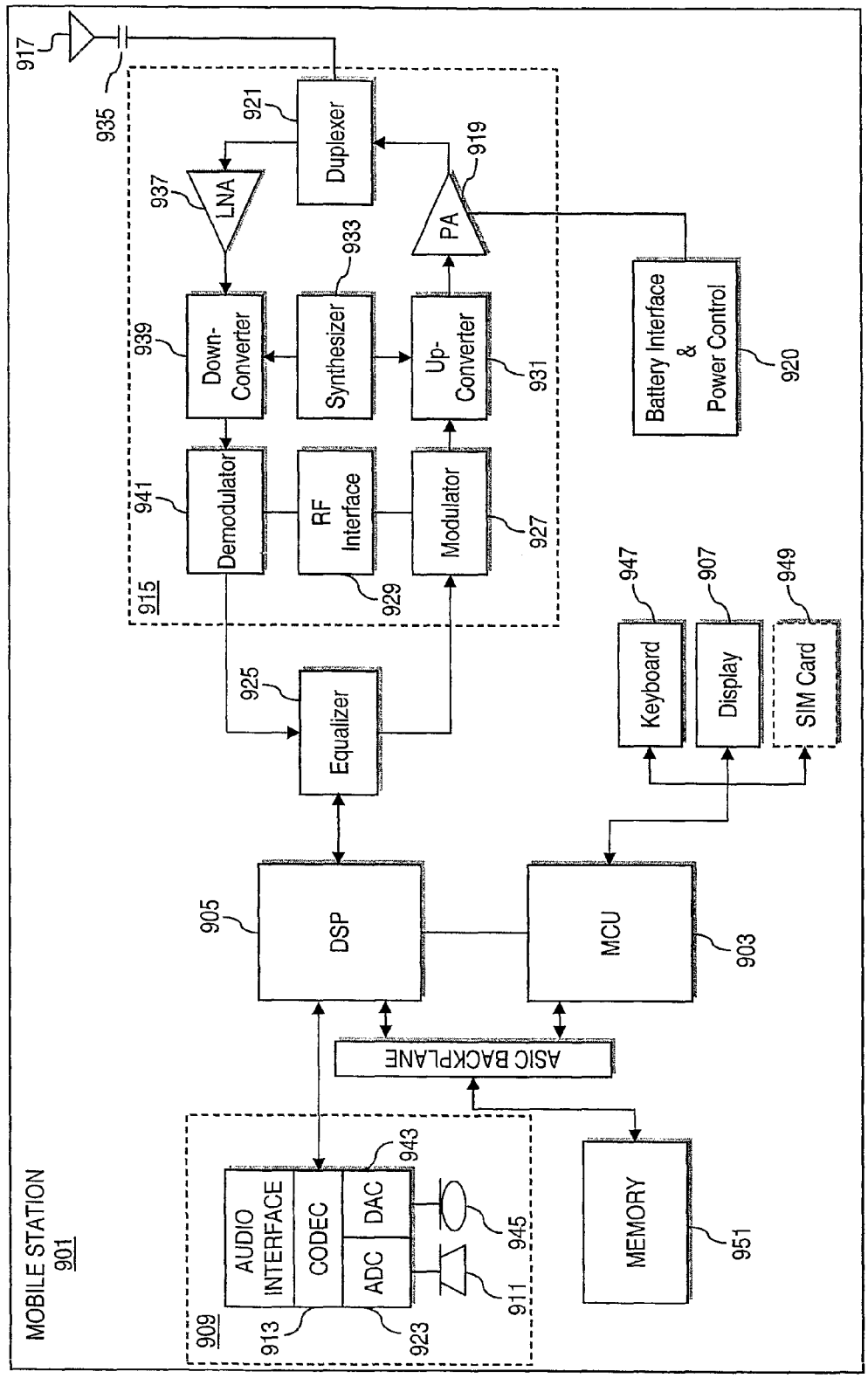
FIG. 9 is a diagram of exemplary components of a mobile station capable of operating in the systems of FIGS. 8A and 8B, according to an embodiment of the invention.

FIG. 9 is a diagram of exemplary components of a mobile station (e.g., handset) capable of operating in the systems of FIGS. 8A and 8B, according to an embodiment of the invention. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system (e.g., systems of FIG. 8A or 8B), via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In the exemplary embodiment, the processed voice signals are encoded, by units not separately shown, using the cellular transmission protocol of Code Division Multiple Access (CDMA), as described in detail in the Telecommunication Industry Association's TIA/EIA/IS-95-A Mobile Station-Base Station Compatibility Standard for Dual-Mode Wideband Spread Spectrum Cellular System; which is incorporated herein by reference in its entirety.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The MCU 903 delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

Figure 10:
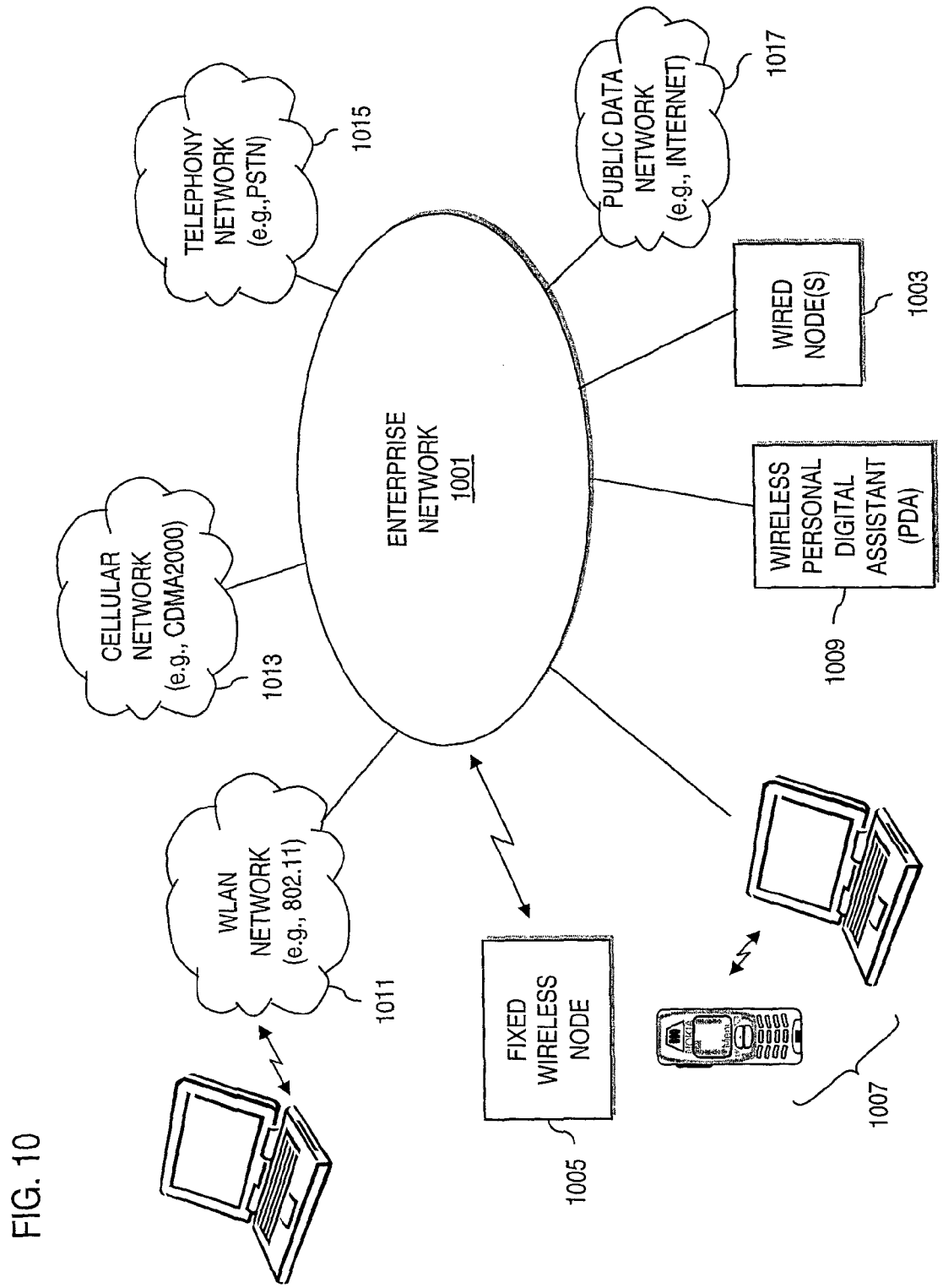
FIG. 10 is a diagram of an enterprise network capable of supporting the processes described herein, according to an embodiment of the invention.

FIG. 10 shows an exemplary enterprise network, which can be any type of data communication network utilizing packet-based and/or cell-based technologies (e.g., Asynchronous Transfer Mode (ATM), Ethernet, IP-based, etc.). The enterprise network 1001 provides connectivity for wired nodes 1003 as well as wireless nodes 1005-1009 (fixed or mobile), which are each configured to perform the processes described above. The enterprise network 1001 can communicate with a variety of other networks, such as a WLAN network 1011 (e.g., IEEE 802.11), a cdma2000 cellular network 1013, a telephony network 1016 (e.g., PSTN), or a public data network 1017 (e.g., Internet).

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving a sub-set of channel parameters through system information signaling;
   automatically mapping control channels to physical resources of a communication network according to the received channel parameters; and
   determining a number of the control channels based on the channel parameters,
   wherein the control channels are separately coded,
   wherein the channel parameters include a number of transmission symbols available in the control channels, and wherein the number of transmission symbols is determined based on a number of sub-carriers available for control information transmission in each of the transmission symbols,
   wherein the control channels are interleaved, and
   wherein the interleaving comprises a matrix of bits of control information corresponding to the control channels, and comprises an inter-column permutation pattern of the matrix; and
   transmitting the control information over the control channels mapped to the physical resources.

2. A method according to claim 1, wherein the physical resources include a plurality of sub-carriers.

3. A method according to claim 2, wherein a portion of the sub-carriers are allocated to a transmission symbol that includes an Orthogonal Frequency Division Multiplexing (OFDM) symbol.

4. A method according to claim 3, wherein the number of OFDM symbols is variable, the method further comprising:
   determining the number of OFDM symbols based on a desired number of the control channels.

5. A method according to claim 1, further comprising:
   adjusting an effective control channel code rate to obtain a desired number of the control channels.

6. A method according to claim 1, further comprising:
   allocating unused sub-carrier symbols according to an interleaving scheme to equally divide the unused sub-carrier symbols over a plurality of transmission symbols.

7. A method according to claim 1, further comprising:
   transmitting data over one of the control channels, the communication network having a Third Generation Partnership Project (3GPP) Long Term Evolution (LTE) architecture.

8. An apparatus, comprising:
   at least one processor, and
   at least one memory including computer program code,
   wherein the at least one memory and the computer program code are configured to, with the at least one processor, cause the apparatus at least to:
   receive a sub-set of channel parameters through system information signaling,
   automatically map control channels to physical resources of a communication network according to the received channel parameters, and determine a number of the control channels based on the channel parameters, wherein the control channels are separately coded, wherein the channel parameters include a number of transmission symbols available in the control channels, and wherein the number of transmission symbols is determined based on a number of sub-carriers available for control information transmission in each of the transmission symbols, wherein the control channels are interleaved, and wherein the interleaving comprises a matrix of bits of control information corresponding to the control channels, and comprises an inter-column permutation pattern of the matrix, and transmit the control information over the control channels mapped to the physical resources.

9. An apparatus according to claim 8, wherein the physical resources include a plurality of sub-carriers.

10. An apparatus according to claim 8, wherein an effective control channel code rate is adjusted to obtain a desired number of the control channels.

11. An apparatus according to claim 8, further comprising:
interleaving logic configured to equally divide unused sub-carrier symbols over a plurality of transmission symbols, wherein the unused sub-carrier symbols are allocated according to an interleaving scheme.

12. An apparatus according to claim 8, further comprising:
a plurality of transmit antennas; and
a transceiver coupled to the transmit antennas and configured to transmit data over one of the control channels, the communication network having a Third Generation Partnership Project (3GPP) Long Term Evolution (LTE) architecture.

13. An apparatus, comprising:
at least one processor; and
at least one memory including computer program code,
wherein the at least one memory and the computer program code are configured to, with the at least one processor, cause the apparatus at least to:
determine location of one of a plurality of coded control channels established over a multiple input multiple output (MIMO) communication system by automatically mapping the control channels to a plurality of sub-carriers designated for use within the system,
wherein the sub-carriers are allocated to a plurality of transmission symbols that include Orthogonal Frequency Division Multiplexing (OFDM) symbols, wherein the at least one memory and the computer program code are further configured to, with the at least one processor, cause the apparatus at least to receive a sub-set of channel parameters through system information signaling, wherein the at least one memory and the computer program code are further configured to, with the at least one processor, cause the apparatus at least to determine a number of the control channels based on the sub-set of channel parameters, wherein the channel parameters include a number of transmission symbols available in the control channels, and wherein the number of transmission symbols is determined based on a number of sub-carriers available for control information transmission in each of the transmission symbols, wherein the control channels are interleaved, and wherein the interleaving comprises a matrix of bits of control information corresponding to the control channels, and comprises an inter-column permutation pattern of the matrix, and transmit the control information over the control channels mapped to the physical resources.

14. An apparatus according to claim 13, wherein the number of OFDM symbols in each of the control channels is variable, the at least one memory and the computer program code are further configured to, with the at least one processor, cause the apparatus at least to determine the number of OFDM symbols based on a desired number of the control channels.

15. An apparatus according to claim 13, wherein the number of OFDM symbols is predetermined, and the at least one memory and the computer program code are further configured to, with the at least one processor, cause the apparatus at least to adjust an effective control channel code rate to obtain a desired number of the control channels.

16. An apparatus according to claim 13, further comprising:
a plurality of antennas; and
a transceiver configured to transmit data over one of the control channels of the MIMO communication system, the MIMO communication system having a Third Generation Partnership Project (3GPP) Long Term Evolution (LTE) architecture.

* * * * *